United States Patent [19]

Previero

[11] Patent Number: 5,518,616

[45] Date of Patent: May 21, 1996

[54] PLANT FOR THE SEPARATION AT HIGH TEMPERATURE OF CONTAMINANTS OF VARIOUS TYPES FROM PLASTIC MATERIAL IN SMALL PIECES OR LEAVES

[75] Inventor: Flavio Previero, Lipomo, Italy

[73] Assignee: SOREMA s.r.l., Erba, Italy

[21] Appl. No.: 356,258

[22] PCT Filed: Jun. 25, 1993

[86] PCT No.: PCT/EP93/01646

§ 371 Date: Dec. 30, 1994

§ 102(e) Date: Dec. 30, 1994

[87] PCT Pub. No.: WO94/00282

PCT Pub. Date: Jan. 6, 1994

[30] Foreign Application Priority Data

Jun. 30, 1992 [IT] Italy .................... MI92A1596

[51] Int. Cl.$^6$ .................... B01D 21/26
[52] U.S. Cl. .................... 210/512.2; 210/805; 210/788; 210/294; 210/380.1; 209/728; 209/730; 241/19; 241/21
[58] Field of Search .................... 210/787, 805, 210/806, 512.1, 512.2, 360.1, 304, 380.1, 294; 241/19, 21; 209/728, 730

[56] References Cited

U.S. PATENT DOCUMENTS

| | | | |
|---|---|---|---|
| 4,034,862 | 7/1977 | Bahri et al. | 209/11 |
| 4,160,722 | 7/1979 | Marsh | 209/4 |
| 4,441,262 | 4/1984 | Gazzoni. | |
| 5,232,607 | 8/1993 | Lundquist | 210/787 |
| 5,236,603 | 8/1993 | Sampson | 210/787 |
| 5,390,860 | 2/1995 | Ali et al. | 241/20 |

FOREIGN PATENT DOCUMENTS

| | | |
|---|---|---|
| 60572 | 9/1982 | European Pat. Off. . |
| 2293522 | 7/1976 | France . |

Primary Examiner—Robert A. Dawson
Assistant Examiner—David A. Reifsnyder
Attorney, Agent, or Firm—Cushman, Darby & Cushman

[57] ABSTRACT

A plant for the separation at high temperatures of contaminants from plastic material in small pieces or in leaves, including at least one stage (2) for the separation of contaminants, which in turn includes a centrifugal separator device designed to separate an input flow of plastic material in small pieces or in leaves, with contaminants and a conveying fluid comprising water and steam, into a main flow of the material and the conveying fluid and into a secondary flow of the contaminants and the conveying fluid. The separation stage includes, moreover, a cyclone designed to receive in input the secondary flow and to divide it into a discharge flow of the contaminants and water and into a flow of steam which is conveyed towards the inlet of the separation device of the same stage and/or of the previous stages. A final cyclone (3) is preferably provided, connected in cascade to all the possible stages of separation of the plant to receive in input the main flow in output at the final stage and separate it, in turn, into a flow of material and water conveyed to the outside of the plant, and into a flow of steam conveyed towards the inlet of the separation device of at least one of the stages which precede it.

3 Claims, 2 Drawing Sheets

PLANT FOR THE SEPARATION AT HIGH TEMPERATURE OF CONTAMINANTS OF VARIOUS TYPES FROM PLASTIC MATERIAL IN SMALL PIECES OR LEAVES

Plant for the separation at high temperatures of contaminants of various types from plastic material in small pieces or leaves

BACKGROUND OF THE INVENTION

The present invention relates to a plant for the separation at high temperatures of contaminants of various types from plastic material in small pieces or in leaves.

This is a need which is particularly felt during processes for the recycling of plastic material: the material must in fact be freed of different contaminants such as for example paper, glue, wood and, more generally, various types of fibres.

The existence of a centrifugal dryer is also known as being particularly suitable for plastic material in small pieces previously washed. This dryer has been described in the Gazzoni, U.S. Pat. No. 4,441,262, issued Apr. 10, 1984.

It has also been seen that the dryer can be used as a device for separating contaminants from plastic material in small pieces or leaves.

This operation is rendered particularly effective if performed at high temperatures using water and steam, with chemical additives if required, as a fluid for conveying the material along the plant.

The use of steam as a component of the conveying fluid however entails high costs both in energy terms and in terms of equipment for producing the steam itself.

SUMMARY OF THE INVENTION

The main object of the invention is therefore to provide a plant for the separation at high temperatures of contaminants from plastic material in small pieces or leaves which uses a centrifugal separation device such as the one mentioned above and functioning with a conveying fluid consisting of water and steam in which the use of steam does not entail costs which are too high both in energy terms and in terms of equipment for the production of steam.

In accordance with the invention the object is achieved by means of a separation plant characterised in that it comprises at least one stage for the separation of contaminants which comprises, in turn, a centrifugal separator device designed to separate an input flow consisting of plastic material in small pieces or leaves, with contaminants, and a conveying fluid comprising water and steam, into a main flow of the material and the conveying fluid and into a secondary flow of the contaminants and the conveying fluid, and a cyclone designed to receive in input the secondary flow and to divide it into a discharge flow of the contaminants and water and into a flow of steam which is conveyed towards the inlet of the separation device of the same stage and/or of previous stages.

Moreover, a final cyclone is preferably provided, connected in cascade to all the possible separation stages of the plant to receive in input the main flow in output at the final stage and to separate it in turn into a flow of material and water carried outside of the plant, and into a flow of steam conveyed towards the inlet of the separation device of at least one of the stages which precede it.

The use of a cyclone on the discharge outlet of each stage or at the outlet of the whole plant is justified by the fact that, as is known, the cyclone is a device designed to confer a rotary motion to a fluid contained therein. The rotary motion, in a manner likewise known, can facilitate, through a centrifugal action, the separation of various components of the fluid itself. In this particular case, the action of the cyclone is exerted in two different points: at the discharge outlet of each stage of separation and at the outlet of the plant itself.

The recycling of steam in the separation plant, made possible by the use of cyclones at each of the stages whereof the plant is composed and connected in cascade to all the stages, represents a considerable saving both in terms of energy costs and of equipment for the production of steam.

BRIEF DESCRIPTION OF THE DRAWINGS

The features of the present invention will be made clearer by the following detailed description of its possible embodiment, shown by way of a non-limiting example in the accompanying drawings, in which.

DETAILED DESCRIPTION

Figure 1:
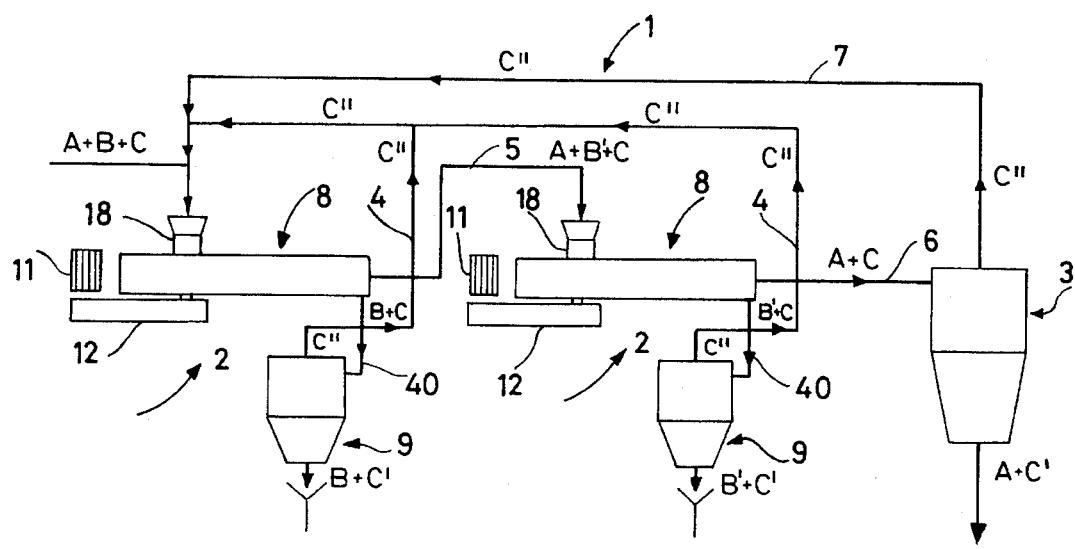
FIG. 1 shows schematically as a whole a plant according to the invention.

Schematically, as is clear from FIG. 1, the plant 1 is composed of a series of separation stages 2 and a cyclone 3 for ejecting material, freed from the contaminants, from the plant itself.

Each stage 2 is connected to a previous stage 2 via piping 4 and to the next one by means of piping 5, the last stage 2 is connected to the cyclone 3 and to the first stage 2 by means of piping 6 and piping 7 respectively.

The number of stages 2 used (in the case illustrated in FIG. 1 number is two) is such to guarantee sufficient elimination of contaminants from the material subjected to treatment in the plant 1.

A generical stage 2 comprises two main elements: a centrifugal separation device 8 and a discharge cyclone 9. The two elements are connected by means of piping 40.

Figure 3:
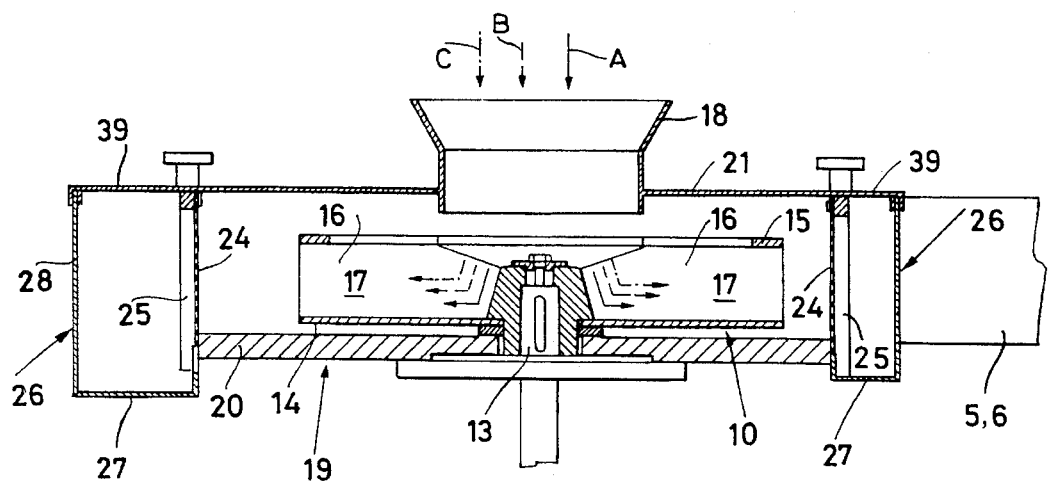
FIG. 3 shows the device sectioned axially along line III—III of FIG. 2.
Figure 2:
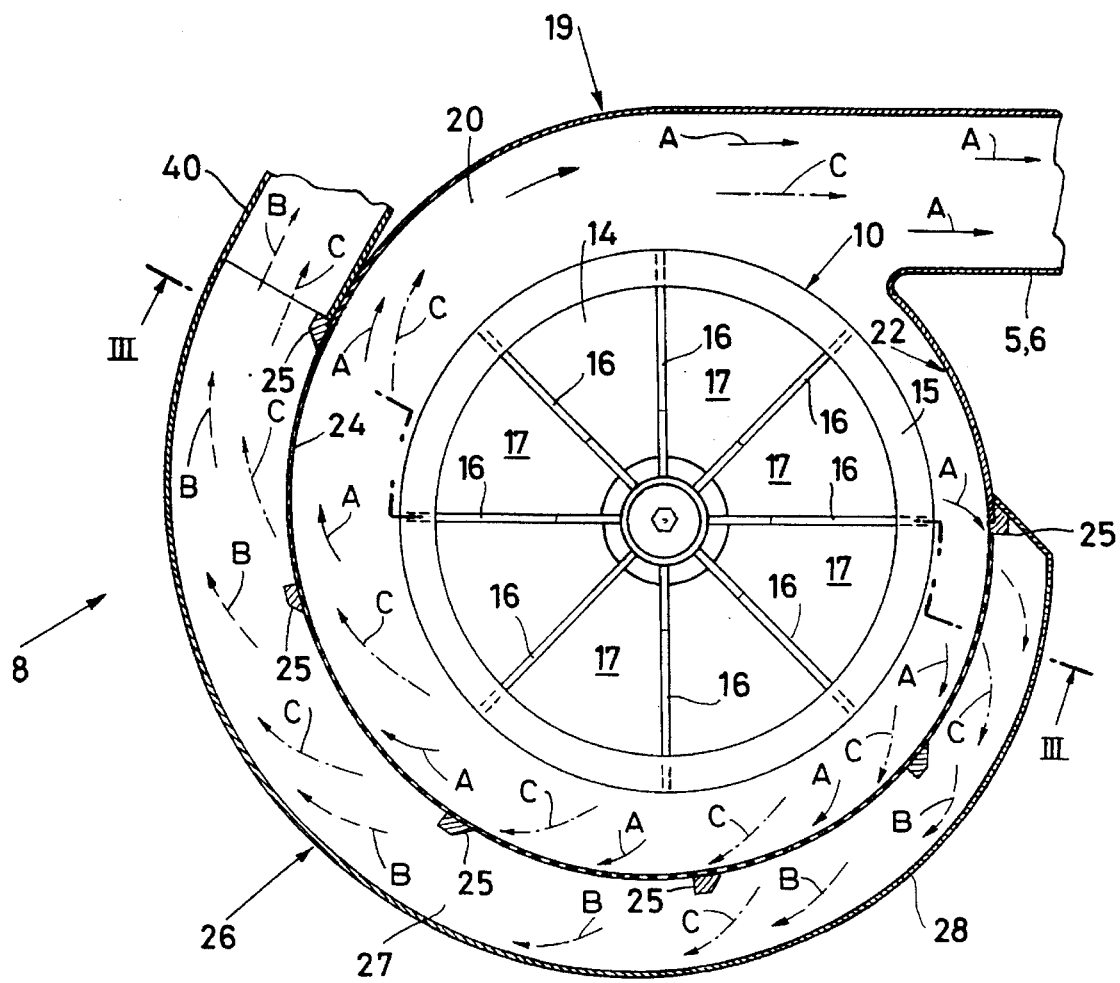
FIG. 2 shows in horizontal section a centrifugal separation device of a single stage of the plant.

The separation device illustrated in detail in FIGS. 2 and 3 comprises a rotor 10 with vertical axis which is made to rotate in a clockwise direction (looking at FIG. 2) by a drive motor 11 connected by means of a belt 12 to a shaft 13 to which the rotor 10 is attached rigidly.

The rotor 10 comprises a lower base disk 14, an upper ring 15 and a plurality of vertical walls or "blades" 16, which define a corresponding plurality of radial channels 17 open above and outwards so as to receive from above the material (A) with contaminants (B) and the conveying fluid (water and steam) (C) through a filling mouth 18 and, due to the rotation of the rotor 10, centrifuge them outside by the rotor itself.

A first scroll 19 develops around the rotor 10, being formed by a base wall 20, a covering wall 21, through which the filling mouth 18 crosses, and by a lateral, gradually flaring, wall 22, which leads towards the piping 5, which connects it, in turn, to the filling mouth 18 of the separation device 8 of the next stage 2, or towards the piping 6 which connects it to the output cyclone 3 in the case wherein the separation device 8 belongs to the terminal stage 2 of the plant 1. A portion of the lateral wall 22, with an extension of more than 180°, includes a perforated grating 24 fitted with external reinforcements 25 composed of small, vertical and chamfered columns appropriately distanced one from the other.

Around the first scroll 19, a second scroll 26 in turn develops, formed by an external annular extension 39 of the covering wall 21 of the scroll 19, by a flaring external lateral wall 28 and by a base wall 27 slightly tilted towards piping 40 which is connected to the discharge cyclone 9.

Figure 4:
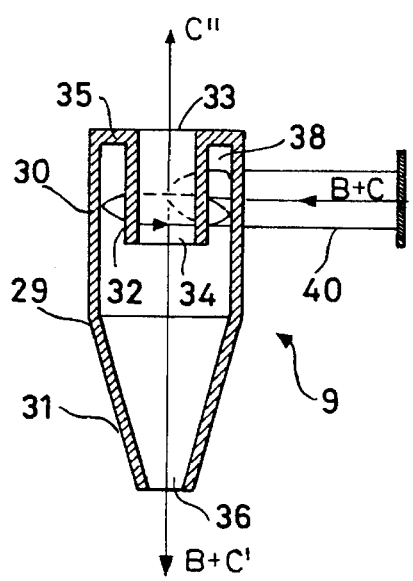
FIG. 4 shows in axial section a cyclone of a single stage of the plant.

The separation device 8 is in fact related to a device for discharging contaminants and for recycling steam (FIG. 4) which is composed of a cyclone 9 with vertical axis formed by an external lateral wall 29, whose upper part 30 is cylindrical and whose lower part 31 is a truncated cone. The cyclone 9, internally, has a cylindrical sleeve 32 with vertical axis. The cylindrical sleeve 32 is open at the two bases, openings 33 and 34, and is connected above to the lateral wall of the cyclone by means of an annular plate 35. The cyclone 9, in its lower part 31, leads to the outside through a discharge opening 36. The piping 4 is inserted in the opening 33.

Flowing into the upper cylindrical part 30 of the external lateral wall 29 is the inlet piping 40 leading from the separation device 8 which carries contaminants and conveying fluid (B+C) separated from the material being treated (A); the pipe 40 is inserted tangentially in an annular space 38 defined by the upper part 30 of the Lateral wall 29 of the cyclone 9 and by the cylindrical sleeve 32.

During operation the material (A), the contaminants (B) and the conveying fluid (C) flow in from above, through the filling mouth 18, into the various radial channels 17 of the rotor 10 of the separation device 8 of the first stage 2 of the plant 1. The vertical walls 16 of said rotor 10, acting as blades, centrifuge them, beating them violently against the perforated grating 24, in this way enabling the material (A) to be separated from the contaminants (B) and creating a main flow (A+B'+C) which, by following the development of the scroll 19 and through the piping 5, enables the material (A) to be transported towards a next stage 2 for further elimination of any residual contaminants (B').

All this is made possible in that the impact of the material, of the contaminants, of the conveying fluid (A+B+ C) against the grating 24 causes the separation of part of the contaminants (B) from the material (A). Another part of the contaminants is however extracted through the action of the conveying fluid (C) which, passing among the small leaves of the material (A), partially flows out from the scroll 19 through the holes of the grating 24, taking with it part of the contaminants (B) and causing a secondary flow (B+C). The conveying fluid (C) which has flowed out of the first scroll 19 then conveys the contaminants (B) along the more external scroll 26 and towards the discharge cyclone 9, assisted therein by the base wall 27 and by the gradual flaring of the external lateral wall 28.

The contaminants and the conveying fluid (B+C) fed into the upper part of the discharge cyclone 9 are conferred, by virtue of the tangential inlet of the pipe 40 and the structure of the upper part of the cyclone (upper part 30 of the lateral wall 29 and cylindrical sleeve 32), a rotary motion for the purposes of separating contaminants (B) and water (C') from the steam (C"). At the end part of the cylindrical wall 30 and of the lower opening 34 of the sleeve 32, two different flows are formed: a discharge flow consisting of contaminants and of water (B+C') which, through the effect of gravity, flows downwards at the opening 36, and a rising flow of steam (C") which moves towards the opening 33 of the cyclone 9 and then towards the piping 4 to then be re-fed into the flow in input to the separation device 8.

The functioning of the stages 2 subsequent to the first (FIG. 1 shows only one of these intermediate stages) is the same with the sole difference that, in the case of an intermediate stage or of the terminal stage, the input flow consisting of material, any residual contaminants and conveying fluid (A+B'+C), does not come from the outside but from the stage 2 immediately preceding the current stage via the piping 5. The output cyclone 3 is located at the terminal stage 2 and connected to the separation device 8 of the stage via the piping 6. Its functioning is similar to that of the discharge cyclones 3 of the different stages 2 with the obvious difference that, while in the second the flow is divided up in input, (B+C) or (B'+C), into a downward flow of water and contaminants, (B+C') or (B'+C') and into an upward flow of steam (C"), in the first case the input flow (A+C) is divided up into a flow of water and material without contaminants (A+ C') and into an upward flow of steam (C"), respectively.

I claim:

1. An apparatus for separating contaminants from plastic material in small pieces or leaves, at high temperature, comprising:

at least one stage including a separating device for receiving at an inlet port an inlet flow of said plastic material, said contaminants and a conveying fluid made of water and steam and centrifugally separating said inlet flow into a main flow directed to an outlet port and containing said plastic material and a part of said water and steam of said conveying fluid, and a secondary flow directed to a discharge port and containing said contaminants and a remaining part of said water and steam of said conveying fluid;

each said stage further including a cyclone for receiving said secondary flow and dividing said secondary flow into a discharge flow directed to a cyclone discharge port and containing said contaminants and said water of said remaining part and a recycling flow directed to a cyclone recycling port and containing said steam of said remaining part; and conduit means for returning said recycling flow with said steam of said remaining part to said inlet port of a respective said separating device.

2. The apparatus of claim 1, in which:

said at least one stage comprises a plurality of stages which are serially connected in cascade from an initial stage to a final stage with the outlet port of the separating device of each respective upstream stage connected with the inlet port of the separating device of the respective subsequent downstream stage and the recycling port of the cyclone of each respective downstream stage connected with the inlet port of the separating device of the initial stage;

the apparatus further comprising:
   an additional cyclone for receiving the main flow from said final stage and separating said main flow into an outlet flow of plastic material and water and a recycling flow of steam; and
   further conduit means for returning said recycling flow of steam to the inlet port of said initial stage.

3. The apparatus of claim 1, wherein each said separating device includes:
- a rotor arranged to rotate about a vertical axis thereof and having an upwardly facing inlet opening for receiving, from thereabove, and and centrifuging said inlet flow of plastic material, contaminants and conveying fluid;
- a first scroll peripherally developed around and radially inwardly opening towards said rotor for receiving said flow from said rotor; said first scroll including an outlet for said main flow at a rotationally downstream end thereof, relative to said rotor; said first scroll including a perforated radially outer peripheral wall for passing said secondary flow out of said first scroll; and
- a second scroll peripherally developed around and radially inwardly opening towards said first scroll via said perforated wall; said second scroll including an outlet for said secondary flow at a rotationally downstream end thereof, relative to said rotor.

* * * * *